United States Patent
Pötzschke et al.

(10) Patent No.: US 6,577,393 B1
(45) Date of Patent: Jun. 10, 2003

(54) POLARIMETRIC METHOD FOR DETERMINING THE (MAIN) VIBRATION PLANE OF POLARIZED LIGHT TO ABOUT 0.1M° AND MINIATURIZED DEVICE FOR ITS IMPLEMENTION

(75) Inventors: Harald Pötzschke, Wiesbaden (DE); Wolfgang Barnikol, Mainz (DE); Kai Zirk, Ostheim (DE)

(73) Assignee: Glukomeditech AB (DE)

( * ) Notice: Subject to any disclaimer, the term of this patent is extended or adjusted under 35 U.S.C. 154(b) by 0 days.

(21) Appl. No.: 09/719,388

(22) PCT Filed: Jun. 11, 1999

(86) PCT No.: PCT/EP99/04015
§ 371 (c)(1),
(2), (4) Date: Mar. 23, 2001

(87) PCT Pub. No.: WO99/66309
PCT Pub. Date: Dec. 23, 1999

(30) Foreign Application Priority Data

Jun. 12, 1998 (DE) .......................... 198 26 294

(51) Int. Cl.⁷ .................................. G01J 4/00
(52) U.S. Cl. .......................... 356/364; 356/369
(58) Field of Search ................. 356/364, 369, 356/370, 73

(56) References Cited

U.S. PATENT DOCUMENTS 4,467,204 A * 8/1984 Kysilka et al. ............. 250/343

FOREIGN PATENT DOCUMENTS

EP 030610 6/1981
WO 86/02162 4/1986

OTHER PUBLICATIONS

Zhou et al (Review of Scientific Instruments, vol. 64, No. 10, pp. 2801–2807, Oct. 1993, U.S.A., Zhou, G.X.; Schmitt, J.M.; Ellicott, C.E.) in view of Kysilka et al (US 4,467, 204).*

Sensitive detection of optical rotation in liquids by reflection polarimetry, G.X. Zhou, et al, Review of Scientific Instruments, vol. 64, No. 10, Oct. 1993, pp. 2801–2807.

* cited by examiner

*Primary Examiner*—Frank G. Font
*Assistant Examiner*—Roy M. Punnoose
(74) *Attorney, Agent, or Firm*—Banner & Witcoff, Ltd.

(57) ABSTRACT

In a process or device for very accurate determination of the plane of polarization of polarized light, the light from a light source (1) is polarized by means of a polarizing filter (2) which has a certain setting angle $\theta_0$ with respect to the first reference plane, the plane of incidence on the reflecting surface (4). The polarized beam (12) passes through the sample in the measurement chamber (3), in which the angle of rotation is changed by the small angle $\theta_{MG}$. The sum of $\theta_0$ and $\theta_{MG}$ gives the angle of rotation $\theta_e$, at which the beam (13) emerging from the measurement chamber is partially reflected at the surface of a medium of higher refractive index (4). The reflected beam is then separated into two partial beams (15a: extraordinary beam; 15b: ordinary beam), with vibration directions exactly perpendicular to each other, in a polarizing prism (5), the reference plane of which, the plane of vibration of the ordinary beam, has a certain setting angle ($\theta^*$) with respect to the first reference plane. The intensities $I_o$ and $I_a$ of the two partial beams are determined photometrically by detectors (6a,b) and the ratio (Q) of the measured intensities is determined (quotient determiner 8).

14 Claims, 3 Drawing Sheets

POLARIMETRIC METHOD FOR DETERMINING THE (MAIN) VIBRATION PLANE OF POLARIZED LIGHT TO ABOUT 0.1M° AND MINIATURIZED DEVICE FOR ITS IMPLEMENTION

BACKGROUND OF THE INVENTION (1) Field of the Invention

The invention concerns a procedure according to the generic part of Patent claim 1 and a device according to the generic part of Patent claim 10 for implementing it.

(2) Description of Related Art

Human sugar disease (Diabetes mellitus) is characterized by improper regulation of the metabolism of grape sugar (glucose) in the body and body fluids, with continuous or sporadic elevated concentrations (reflections) of it in the body (hyperglycemia) or, in case of infections, sudden seriously lowered concentrations (hypoglycemia). An excessive blood level causes several pathogenic changes, especially in the blood vessels, some of those lead to extremely serious consequences, such as blindness, loss of kidney function, cardiac infarcts and death of the extremities (gangrene). An inadequate blood level causes, in particular, irreversible death of nerve cells. Therapy of Diabetes mellitus requires that the blood glucose level be maintained consistently at values within a suitable range and, at least in its more severe forms, requires administration of the natural body hormone insulin. The insulin acts to lower the body glucose level. On the other hand, if the sugar level is too low, administration of grape sugar is required. The amount of insulin to be injected, or the need for taking glucose, depends on the concentration of glucose—both the current level and its course during the day. Therefore, the concentration must be measured often to frequently every day, usually by the patient himself. However, it is not as possible to test during sleep. And the biochemical methods for measuring the glucose concentration, now used almost exclusively in medicine, require drawing fresh blood every time, after injuring oneself every time, usually at the fingertip; and they give only instantaneous values. At present there is no method for continuing measurement of the current grape sugar concentrations with sufficient accuracy over the long term. Such a method would be extremely desirable and helpful for the patients.

The following survey of the state of the art is derived from the latest research results, presented at the 33rd Annual Meeting of the German Diabetes Society (Leipzig, May 1998) and from the available patent literature.

Attempts to utilize the biochemical methods mentioned by immobilizing the enzymes used in an implantable probe have as yet been only partially successful. In contact with the body fluids, the enzyme loses its activity, and the sensor must be replaced after no more than a few days. Thus there are no implantable probes under consideration, but only insertable ones, with all the disadvantages of a wound kept open for a long period (the insertion site). Therefore, only detectors based on physical methods of measurement are suitable for implantation, as presumably only those can be stable for an extended period.

Research on developing sensors which measure through the skin (transcutaneously) by optical methods, based on absorption or scattered light photometry or spectrometry, the former particularly by means if infrared radiation, are at present far from being ready for use.

One suitable physical method on the basis of which an implantable glucose sensor could be developed is optical rotation. That is the rotation of the vibration plane of polarized light by optically active substances, of which dissolved glucose is one. It dominates the optical rotation of the body fluids. The magnitude of the rotation depends both on the concentration of the substance and on the path length of the light through the solution. As a result, the concentration of the substance can be determined from the angle of rotation. But if the concentration of the substance being determined is low, as for glucose in the body, it is necessary either to extend the light path suitably to increase the angle of rotation, and/or to increase the sensitivity of the sensor. Both alternatives lead to problems, particularly if the measuring device is to be miniaturized. The object of this invention is a process for determining very small angles of rotation, the characteristics of which are adequate for development of an implantable glucose sensor.

DE 27 24 543 C2 describes a polarimeter for measuring blood glucose. Its principle of operation has a semitransparent mirror which produces two partial beams by reflection and transmission. The difference in the light intensities of the two beams ("reference beam" and "main beam") is determined as a measure of the angle of rotation. But that depends on the total intensity of the measuring light. Fluctuations in that are an important factor disturbing the measurement signal.

EP 00 30 610 B1 contains a further development of DE 27 24 543 C2, a polarimeter for determining small angles of rotation (from which a glucose sensor could be developed). The procedure is based on reflection of a polarized light beam at a medium of higher refractive index (such as a plane-parallel plate). Then the intensities of the reflected and refracted partial beams are measured. To attain an additional (partial) analyzer action, the angle of incidence used lies between the limiting angle for total reflection and the polarization angle. Following the beam divider, another polarizing filter is introduced into each of the two partial beams. Thus the remaining signal processing uses portions of the total intensity.

EP 01 23 057 A1 and EP 01 53 313 B1 likewise describe a procedure for polarimetry. An optical grooved grating acts as the beam divider, producing several partial beams. Information about the plane of polarization of the light emerging from the sample is determined from the reduced light intensity of a sample beam after passage through a polarizing filter acting as an analyzer. The quotient of the signals from the intensity detectors in the reference and sample beams is taken, as a relative signal from the sample beam detector signal, to eliminate the distorting effect of varying total light intensity.

A procedure for accurate determination of the plane of vibration of polarized light is known from U.S. Pat. No. 4,467,204. There the light source is only IR light and the reflecting surface for optical amplification is not disclosed. A miniature design is known from U.S. Pat. No. 4,988,199. There, too, the reflecting surface is absent. None of the patents cited, although none are of very recent date, has yet led to a technological development that has become known. The procedures described apparently cannot meet the requirements stated below.

BRIEF SUMMARY OF THE INVENTION

The following requirements are necessary or desirable for an implantable glucose sensor based on a polarimeter:

The sensor should make it possible to determine the vibration plane of polarized light accurately to 0.3 m° (m°: millidegree).

(The total optical rotation due to glucose at physiological concentration (about 1000 mg/L) at a linear optical path length of about 3 cm, which can be attained in medical technology, is about 10 m°. Thus an inaccuracy of 0.3 m° at this glucose concentration is equivalent to a relative error of 3%.)

The sensor should preferably not contain any movable parts, as mechanical systems are subject to wear, which can cause trouble in operation.

Finally, the sensor signal must not be affected by the optical transparency of the sample, as body fluids can clearly change their absorbance, for instance, in the case of jaundice (icterus). Therefore the procedure must be real polarimetry and not polarization photometry.

A procedure is described in the characterizing part of claim 1, which meets the stated requirements and can be miniaturized in its technical design. It is described in the characterizing part of claim 9 as a device for carrying out the procedure. This millidegree polarimeter can be developed into an implantable glucose sensor.

DETAILED DESCRIPTION OF THE INVENTION

Figure 1:
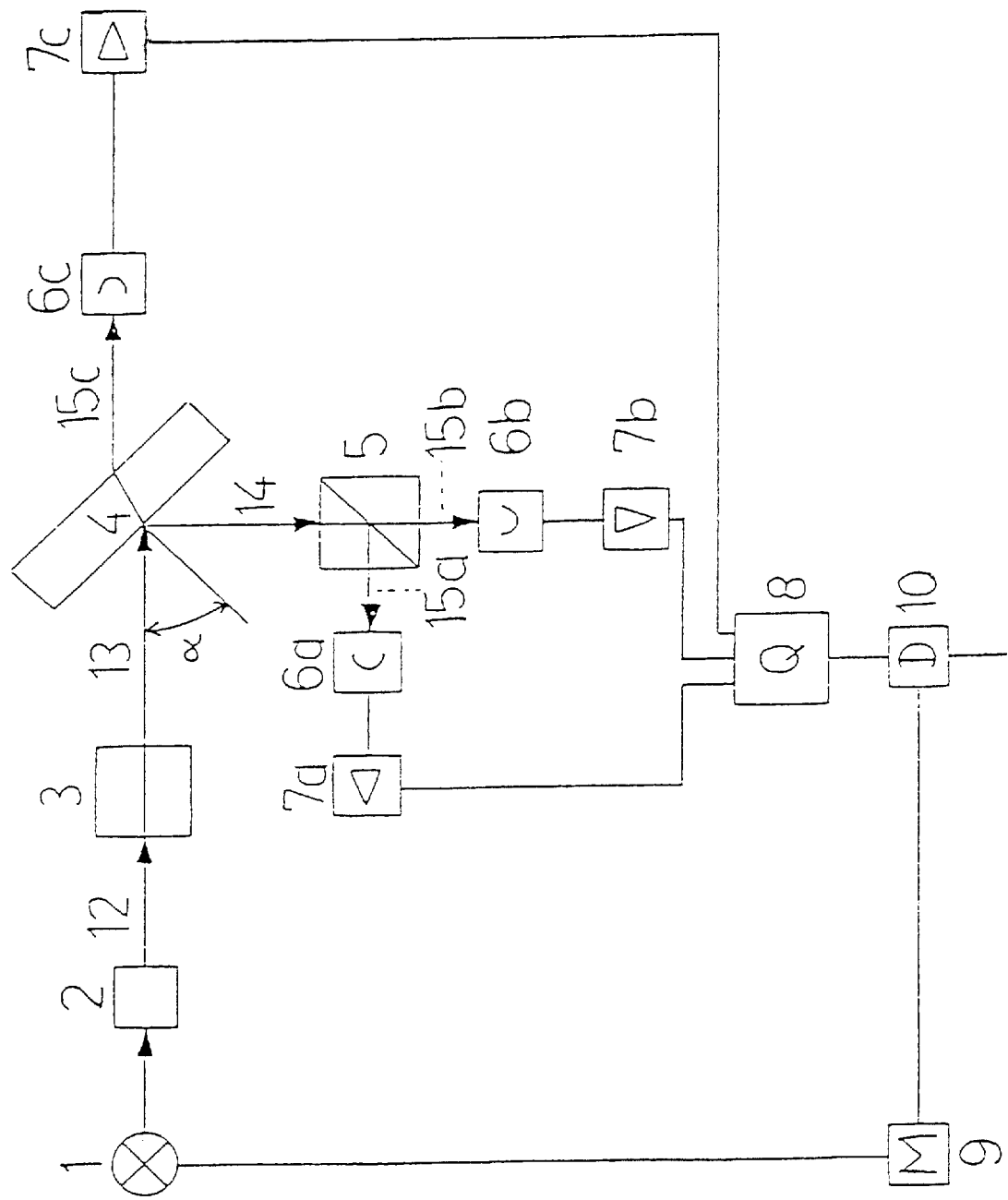
FIG. 1 is a schematic representation of one embodiment of the present invention.

According to the invention, the problems noted are solved by a two-step procedure for amplifying the quantity measured and detection with subsequent special processing of the measurement signal. In the initial step of amplification of the quantity measured, the optical rotation is increased by a single reflection (which can also be performed repeatedly in succession) of the measurement beam at a suitable surface. In the second step, detection of the (orthogonal) components of the total light intensity is made possible by beam division in a polarizing prism. The measurement signals are then processed electronically into a ratio, independent of the light absorption in the sample, as another amplified measure of the optical rotation.

Initial amplification: If a linearly polarized light beam (after, for instance, passing through the optically active medium) is incident, not quite perpendicularly, on a medium of higher refractive index (e. g., the surface of a glass having a refractive index greater than that of the medium adjacent to the surface), then it is (mostly) separated into a reflected and a refracted partial beam.

The vectorial components $E_{e,\parallel}$ and $E_{e,\perp}$ ($\parallel$=parallel, $\perp$=perpendicular; both positions being related to the plane of incidence) of the electric field strength $E_e$ of the incident polarized light, rotated by any angle of rotation ($\theta_e$) from the plane of incidence (or the plane of reflection) are phase-coupled. Then, according to the definitions of angular functions, the following relations apply:

$$E_{e,\parallel} = E_e \cdot \cos\theta_e, \quad E_{e,\perp} = E_e \cdot \sin\theta_e, \quad E_{e,\perp}/E_{e,\parallel} = \tan\theta_e$$

Even after reflection at the incidence angle α (angle between the perpendicular to the surface and the incident light), the reflected components $E_{r,\parallel}$ and $E_{r,\perp}$ of the electric field strength $E_r$ combine to the resultant vibration:

$$E_{r,\parallel} = E_r \cdot \cos\theta_r, \quad E_{r,\perp} = E_r \cdot \sin\theta_r, \quad E_{r,\perp}/E_{r,\parallel} = \tan\theta_r$$

$\theta_r$: angle between the electric field strength $E_r$ and the plane of reflection The reflection coefficients $d_\parallel$ ($=E_{r,\parallel}/E_{e,\parallel}$) and $d_{195}$ ($=E_{r,\perp}/E_{e,\perp}$) of the components of the electric field strengths of the reflected light beam depend, in a known manner (BERGMANN & SCHAEFER, *Lehrbuch der Experimentalphysik, Band III—Optik* [Textbook of Experimental Physics, Vol. 3: Optics] DeGruyter, 1978) on the incidence angle α. Then it follows that $$\tan\theta_r = (d_{195}/d_\parallel)\cdot\tan\theta_e$$

$$= C\cdot\tan\theta_e$$

For an angle of incidence a near the polarization angle $\alpha_p$ (at this angle, the reflected light is polarized exactly opposite to the plane of incidence and the factor C is infinitely large) the factor C assumes very large values. As the total intensity of the reflected light also increases as angle α increases (that is, the reduction of intensity in the measurement system is less), the angle of incidence $\alpha > \alpha_p$ is chosen in the region near $\alpha_p$.

The equation above yields the following relation between the angles of the planes of vibration of the reflected ($\theta_r$) and incident ($\theta_e$) light with the plane of incidence.

$$\theta_r = \arctan(C\cdot\tan\theta_e)$$

The sensitivity of the system is the first derivative ($d\theta_r/d\theta_e$) of this function:

$$d\theta_r/d\theta_e = C\cdot[(1+C^2\cdot\tan^2\theta_e)\cdot\cos^2\theta_e]^{-1}$$

It can be chosen to be very great on approach to the angle of rotation $O_e$, determined by the factor C (=C(α)), and limited only by the signal/noise ratio of the following intensity detectors and signal processing.

Second amplification, detection, and accomplishment of pure polarimetry:

The further increase of signal sensitivity attained according to the invention, and detection without moving parts, are achieved with a polarization beam divider (a polarizing prism). In this prism, the light is divided into two partial beams (ordinary beam and extraordinary beam), with planes of polarization perpendicular to each other. The intensities of these partial beams are measured and the quotient of the values is determined. then the rotation of the plane of vibration is determined from a calibration curve. Let the angle between the vibrational plane of the light incident on the prism and the vibrational plane of the unreflected ordinary beam passing through the prism be $\theta_E$. Extreme values are selected for it; i.e., values near (+/−) 90° or 0°. Preferably, values less than 10° removed from those values are selected. Thus the selection of these extreme values is such that the numerator of the quotient $Q(\theta_e)$ $$Q(\theta_E) = I_o(\theta_E)/I_a(\theta_E) \ \forall \ I_o(\theta_E) > I_a(\theta_E)$$

$$Q(\theta_E) = I_a(\theta_E)/I_o(\theta_E) \ \forall \ I_o(\theta_E) < I_a(\theta_E)$$

$I_o$: light intensity of the ordinary beam $I_a$: light intensity of the extraordinary beam is very large in comparison with the denominator. Then, for $\theta_e$ about 0°, the light intensity $I_o$ is very much greater than $I_a$, and for $\theta_E$ about (+/−) 90°, the light intensity $I_a$ is very much greater than $I_o$. Setting extreme values for the angle $\theta_e$ and thus for the increase of the quotient Q leads to a great signal amplification. That allows determination of very small angles. Also, the quotient has the desired property of being a signal which is independent of changes in the total light intensity whether they are due to fluctuations in the lamp output or to changes in the light transmission of the sample.

Then, for $\theta_E$ near (+/−) 90°:

$$Q(\theta_E) = I_a(\theta_E)/I_o(\theta_E)$$

$$= (I_{max} \cdot \sin^2 \theta_E)/(I_{max} \cdot \cos^2 \theta_E)$$

$$= \tan^2 \theta_E$$

with $I_a$ = intensity of the extraordinary beam
$I_o$ = intensity of the ordinary beam
$I_{max}$ = maximum value of the intensities (Analogously, for $\theta_e$ near 0°(positive or negative), $Q(\theta_e) = \cot^2 \theta_e$. This analogous case is not considered explicitly in the following.)

If this second step is combined with the amplification of the measurement by reflection, described above, then:

$$\theta_E = \theta_r + \theta^*$$

$$= \arctan(C \cdot \tan \theta_e) + \theta^*$$

in which $\theta^*$ is the angle between the reference planes of the first and second steps of amplification. It follows that:

$$Q(\theta_E) = \tan^2(\arctan(C \cdot \tan \theta_e) + \theta^*)$$

Then for the slope $dQ/d\, \theta_e$, and thus for the sensitivity of the complete system, we have:

$$dQ/d\, \theta_e = 2 \cdot \tan\{\arctan(C \cdot \tan \theta_e) + \theta^*\} \cdot (\cos^2\{\arctan(C \cdot \tan \theta_e) + \theta^*\})^{-1} \cdot (1 + C^2 \cdot \tan^2 \theta_e)^{-1} \cdot C \cdot (\cos^2 \theta_e)^{-1}$$

The quantity $dQ/d\, \theta_e$ establishes the sensitivity with which the angle of rotation of the sample, $\theta_{MG}$, can be determined. Obviously, the sensitivity depends on the factor C and on the angular functions. Accordingly, it can also be established and optimized by selection of both factor C (from the angle of incidence α of the reflection) and by the angles $\theta_e$ and $\theta^*$.

Another generally known possibility for increasing the sensitivity is by modulating the light (e. g., modulating the amplitude and/or the frequency; for instance, the light source is a laser diode controlled by an oscillator) before it enters the sample with corresponding demodulation (e. g., with a "lock in" amplifier) of the quotient signal.

In addition, a further reference signal can be obtained to compensate for absorption effects in the sample and for fluctuations in the total intensity of the light emitted from the light source. In that procedure, the partial beam which is not reflected at the first amplification (reflection at a surface) but which is refracted and passes through the glass, is also detected. The sum of all three detector signals can be used as feedback to the supply for the light source.

The procedure presented meets all the requirements stated above for a miniaturiable polarimetry for development into an implantable glucose sensor. In particular, the angle signal, because of taking the quotient, does not depend on absorption of light in the sample.

The calibration curve, $Q = f(\theta_e)$ can be established simply by replacing the cuvet containing the sample by a rotatable polarizing filter, turning it by small amounts, such as 10 m° each time, and determining the quotient each time.

For more detailed explanation of the invention, the device that can be used to carry it out is described in more detail below, with reference to the schematic drawing of FIG. 1.

The light from a light source (1) is polarized by means of a polarizing filter (2) which has a specific setting angle $\theta_o$ with respect to the first reference plane, the plane of incidence on the reflecting surface (4). The polarized beam (12) passes through the sample in the measurement chamber (3), during which the angle of rotation changes by the small angle $\theta_{MG}$. The sum of $\theta_o$ and $\theta_{MG}$ gives the angle of rotation $\theta_e$, at which the beam (13) emerging from the medium is partially reflected at the surface of a medium (4) of higher refractive index. Then the reflected partial beam is separated into two partial beams (15a: extraordinary beam; 15b: ordinary beam) having planes of vibration exactly perpendicular to each other, in a polarizing prism (5). The reference plane of the prism, the plane of vibration of the ordinary beam, has a certain setting angle ($\theta^*$) with respect to the first reference plane. The intensities $I_o$ and $I_a$ of the two partial beams are determined photometrically by detectors (6a, 6b) and the ratio (Q) of the measured intensities is determined (ratio former: 8).

The polarized light (12) can be modulated by a modulator (9; for example, the light source (1) is a laser diode controlled by an oscillator (9)) and the ratio signal correspondingly demodulated (10, for example, by a "lock-in" amplifier).

The intensity of the partial beam (15c) which is not reflected at the first amplification (reflection at a surface) but instead is refracted and passes through the glass, can also be detected (detector: 6c; amplifier 7c).

Figure 2:
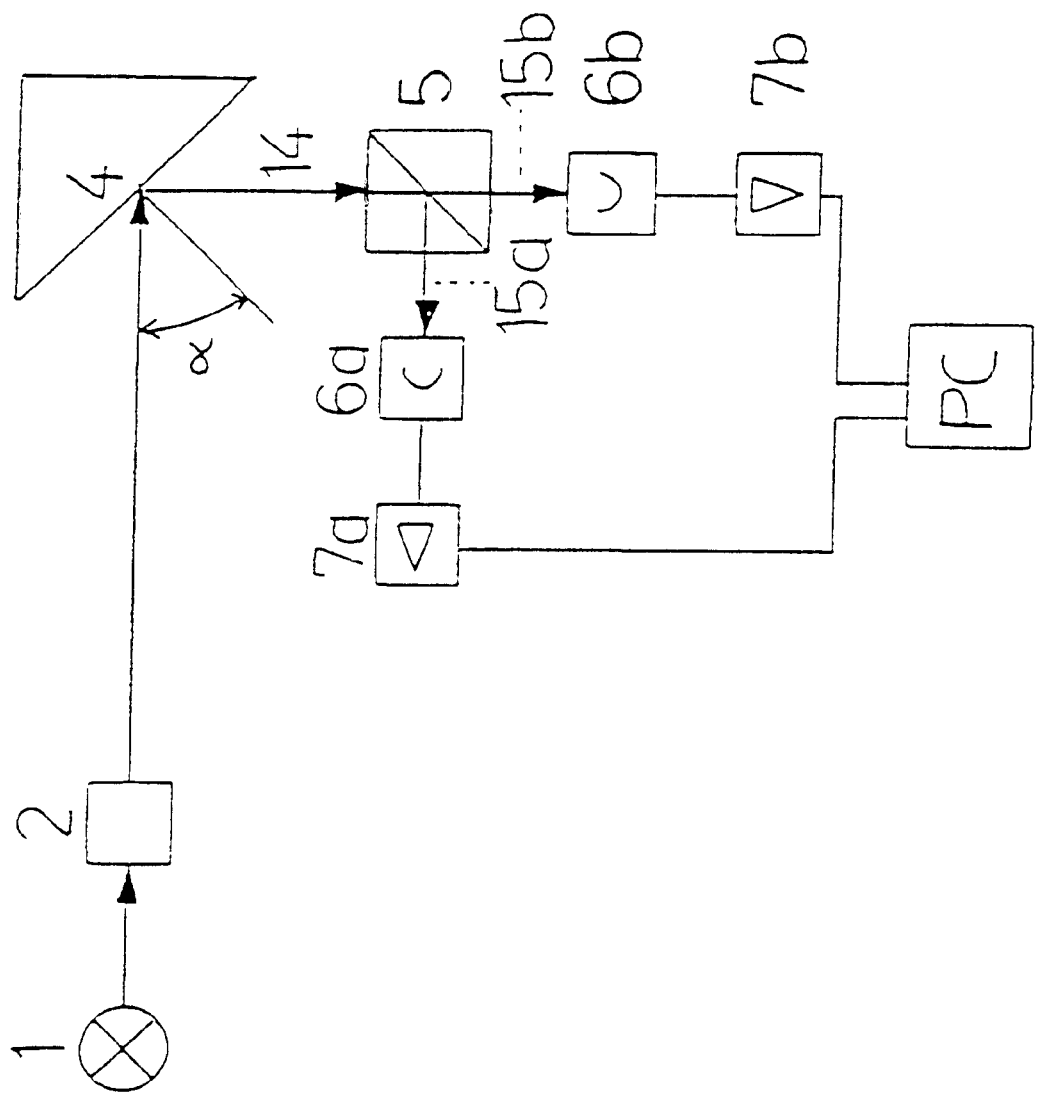
FIG. 2 is a schematic representation of another embodiment of the present invention.

The device used to carry out the process according to the invention is shown schematically, for example, in FIG. 2.

The light source (1) is an unpolarized green helium-neon laser (Model 1652, UNIPHASE, Munich) with a wavelength of 543.5 nm and a power of 0.25 mW. The polarizing filter following it (2; PW 44, B+W FILTERFABRIK, Bad Kreuznach) is set at an angle $\theta_e = 0.11$ to the plane of incidence. The reflecting surface (4) is part of a prism of glass BK 7 (SPINDLER & HOYER, Göttingen), at which the normal to the surface and the incident light beam form an angle α of 60°. The following beam-divider prism (5: GLAN-LASER polarizing prism with two exit windows, SPINDLER & HOYER, Göttingen) at which the plane of vibration of the ordinary beam (15b) and the plane of vibration of the incident light (14) in the stated basic setting make an angle of 15.0°, divides the reflected partial beam. Two silicon photodiodes (S 3399, HAMAMATSU, Herrsching) are used as detectors (6a and 6b). Their photocurrents are amplified by the following current amplifiers (7a and 7b; Model DLPCA-1000, FEMTO, Berlin). The signal collection and computation (forming the ratio; 8) are done by a PC measuring card (PCI-9111 MultiFunction Card, A D LINK, Taiwan) using a 16-bit A/D converter.

Figure 3:
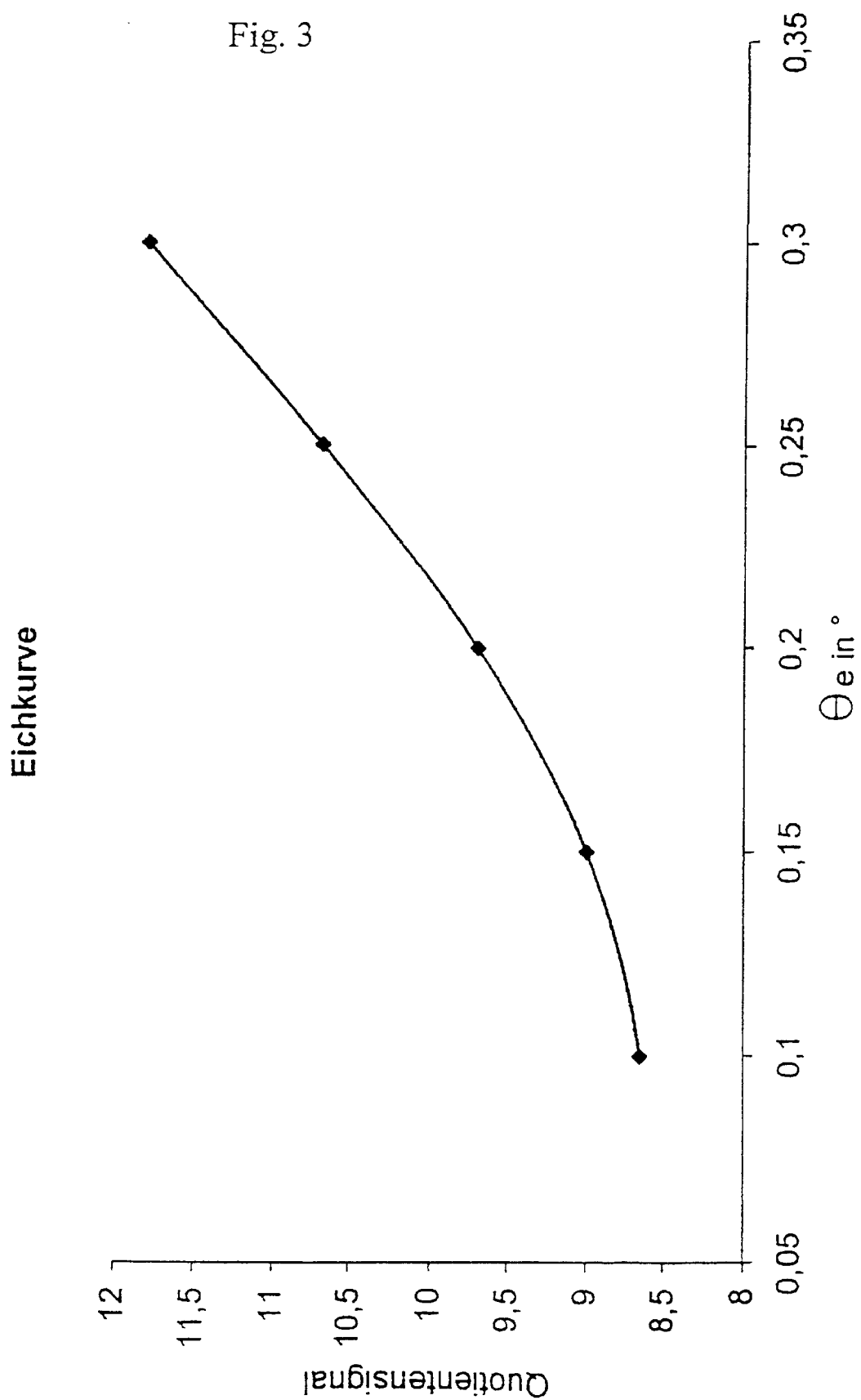
FIG. 3 is a calibration curve relating the measured quotient to the angle of rotation.

The example device gives very accurate measurements, even for samples at low concentrations. FIG. 3 shows a calibration curve measured with the device, beginning with the output angle $\theta_e = 0.1°$. From the measurement, we find an absolute error of about 1 m° for an angle $\theta_{MG}$ in the range of the calibration curve.

This error can be reduced by about an order of magnitude by only the generally known modulation of the light beam with matching demodulation of the final signal.

The possible combination with the "compact" extension of the optical path mentioned above (DE 19 72 7679.2) meets all the requirements given for an implantable glucose sensor based on a polarimeter.

What is claimed is:

1. Process for the very accurate determination of the plane of vibration of polarized light, characterized in that the quantity being measured—the angle between the plane of vibration and a reference plane—is optically amplified by reflection repeatedly in succession of the measurement beam at one or more surfaces, the light beam is separated into partial beams, the light intensities of the partial beams are measured, and the ratio of the intensities of these partial beams is determined as a measurement signal requiring calibration.

2. Process according to claim 1, characterized in that the angle of incidence α of the polarized light (13) incident on the reflecting surface (4) is in the vicinity of the angle of polarization $\alpha_p$, and $\alpha$ is preferably somewhat greater than $\alpha_p$.

3. Process according to claim 1, characterized in that the angle between the vibration plane of the polarized light (13) incident on the reflecting surface (4) and the plane of reflection established by the incident and reflected beams is as small as possible.

4. Process according to claim 1, characterized in that the angle between the plane of vibration of the polarized light (14) incident on the polarizing prism (5) and the plane of vibration of the ordinary beam leaving preferably has a value near 0° or (+/−) 90°.

5. Process according to claim 1, characterized in that the angle between the reflection plane of the reflecting surface (4) and the vibration plane of the ordinary partial beam leaving the polarizing prism (5) is adjustable for signal optimization.

6. Process according to claim 1, characterized in that visible light or near infrared radiation is used with appropriate radiation sources (1).

7. Process according to claim 1, characterized in that the light beam is also modulated and the resulting signals correspondingly demodulated.

8. Process according to claim 1, characterized in that the intensity of the partial beam which is not reflected in the reflection at a surface, but refracted, and passes through the glass, is also detected and used as an additional reference signal.

9. Device for very accurate determination of the (main) plane of vibration of polarized light by means of comparing the measurement with a calibration curve, comprising a light source (1);

a polarizing filter (2) for polarizing light emitted by said light source;

a measuring chamber with sample (3), whereby polarized light passes through said chamber with sample (3);

a component with a reflecting surface (4) for reflecting repeatedly in succession polarized light coming from said chamber with sample (3);

a polarizing prism (5) for separating said polarized light into two partial beams;

detectors (6a, 6b) to measure light intensities of said partial beams;

detector signal amplifiers (7a, 7b) to detect said intensities of said partial beams; and, a ratio former (8) for determining a ratio of said intensities detected.

10. Device according to claim 9, characterized in that the light beam is modulated by a modulator (9) before it passes through the sample and the ratio signal produced at the end is correspondingly demodulated by a demodulator (10).

11. Device according to claim 9, characterized in that the intensity of the beam (15c) refracted at the reflecting surface is detected (6c, 7c) and used as an additional reference signal.

12. Device according to claim 11, characterized in that the light source (1) is a laser diode controlled by an oscillator (9).

13. Device according to claim 12, characterized in that the demodulator (10) is a "lock-in" amplifier.

14. Device according to one of claim 9, characterized in that it is in a miniaturized form and in particular, is implantable as a glucose sensor.

* * * * *